(12) United States Patent
Schuh et al.

(10) Patent No.: US 7,254,617 B2
(45) Date of Patent: Aug. 7, 2007

(54) DISTRIBUTED CACHE BETWEEN SERVERS OF A NETWORK

(75) Inventors: Karl Schuh, Santa Cruz, CA (US); Chris Hawkinson, Fullerton, CA (US); Scott Ruple, 1710 E. Oak Harbor Dr., Gilbert, AZ (US) 85234; Tom Volden, Newport Beach, CA (US)

(73) Assignee: Scott Ruple, Fountain Hills, AZ (US)

( * ) Notice: Subject to any disclaimer, the term of this patent is extended or adjusted under 35 U.S.C. 154(b) by 573 days.

(21) Appl. No.: 10/313,861

(22) Filed: Dec. 6, 2002

(65) Prior Publication Data

US 2004/0111486 A1 Jun. 10, 2004

(51) Int. Cl.
*G06F 9/00* (2006.01)
*G06F 12/00* (2006.01)

(52) U.S. Cl. ................. 709/214; 709/216; 709/205; 709/217; 711/118; 711/120; 711/148

(58) Field of Classification Search ................ 709/214, 709/216, 213, 205, 203, 217, 215; 711/118, 711/119, 148, 147, 120
See application file for complete search history.

(56) References Cited

OTHER PUBLICATIONS

Sarkar, Pransenjit et al., "Efficient Cooperative Caching Using Hints", Department of Computer Science, University of Arizona article.

*Primary Examiner*—Kimberly McLean-Mayo
(74) *Attorney, Agent, or Firm*—Stephen R. Uriarte

(57) ABSTRACT

A distributed cache module that allows for a distributed cache between multiple servers of a network without using a central cache manager. The distributed cache module transmits each message with a logical timestamp. The distributed cache module of a server that receives the message will delay forwarding of the message to, for example, a client computer, if preceding timestamps are not received. This insures a correct order of timestamped messages without requiring a central manager to allocate and control the transmission of the messages within the network. Each distributed cache module will request and possibly retrieve data from the cache of another server in response to a file request for the data. The data of a file may be accessed by a plurality of servers joined in a file context.

32 Claims, 10 Drawing Sheets

DISTRIBUTED CACHE BETWEEN SERVERS OF A NETWORK

BACKGROUND OF THE INVENTION

1. Field of the Invention

The subject matter disclosed generally relates to the field of network servers.

2. Background Information

Computer networks typically include a plurality of client computers that are linked to a number of servers through a communication network. The servers may be coupled to one or more mass storage systems, sometimes referred to as a network attached storage (NAS). The network attached storage is capable of storing a large number of files.

To open a file the client computer sends a file request to the server. If the server cannot satisfy the file request it retrieves the file from the NAS. Mass storage systems typically contain a large number of hard disk or optical drives. Accessing data from a drive is relatively slow. To minimize access time the retrieved file is typically stored in a cache memory of the server. A subsequent request to the server for the file can be satisfied by the server cache.

The size of the cache in each server is relatively limited. Consequently, many file requests result in the accessing of the NAS, which is slow and decreases the useful bandwidth of the network. It is therefore desirable to increase the effective cache of the servers in a network.

In an article entitled "Efficient Cooperative Caching using Hints", Prasenjit Sarkar and John Hartman, Department of Computer Science, University of Arizona, Tuscon, the authors discuss a concept referred to as cooperative caching. In a cooperative caching scheme a server that receives a file request that it cannot fulfill seeks to have the request satisfied by the cache of another server. The server caches are effectively combined to create one large cache that can be accessed by each server.

The cooperative cache system includes a manager that controls access to the cache. The manager locates files within the cache of a server(s) and controls the transfer of the located files. The manager also insures cache coherency between each server cache. The cache manager resides on a separate server connected to the network. Having a separate server increases the cost and complexity of implementing a cooperative or distributive cache system. Additionally, the manager server may become inoperative thereby eliminating the cooperation between caches. It would be desirable to have a cooperative cache system that did not require a central manager(s). Such a system must also insure cache coherency and a transmission protocol that assures proper receipt of transferred data.

BRIEF SUMMARY OF THE INVENTION

A distributed cache system. The system includes a distributed cache module which resides in a first server that has a cache. The distributed cache module requests and retrieves a file block located in a cache of a second server.

DETAILED DESCRIPTION

Disclosed is a distributed cache module that allows for a distributed cache between multiple servers of a network without using a cache manager. The distributed cache module transmits each message with a logical timestamp. The distributed cache module of a server that receives the message will delay forwarding of the message to, for example, a client computer, if preceding timestamps are not received. This insures a correct order of timestamped messages without requiring a central manager to allocate and control the transmission of the messages within the network. Each distributed cache module will request and possibly retrieve data from the cache of another server in response to a file request for the data. The data of a file may be accessed by a plurality of servers joined in a file context.

Figure 1:
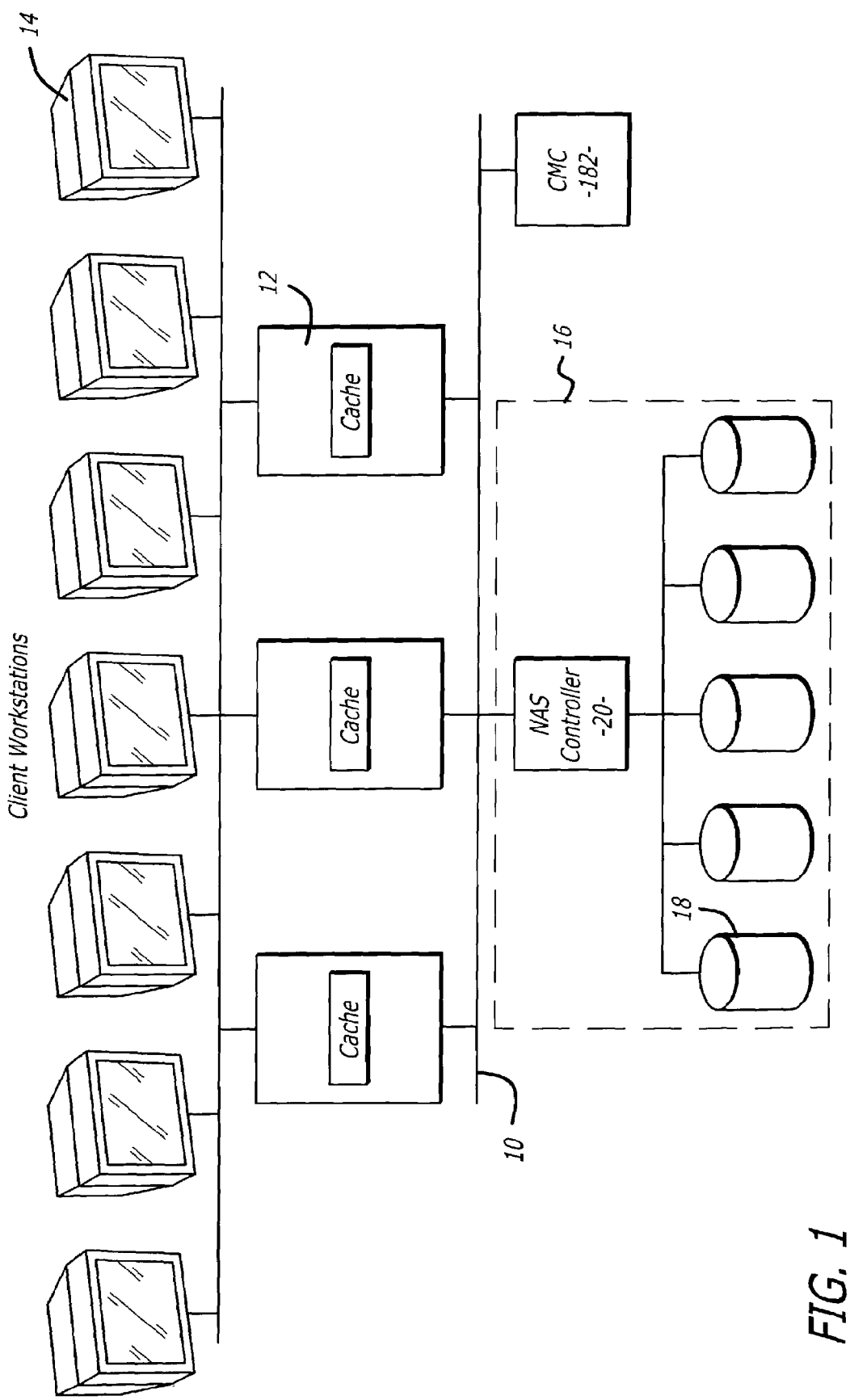
FIG. 1 is a hardware schematic of a network.

Referring to the drawings more particularly by reference numbers, FIG. 1 shows a communication network 10. The network 10 may include a plurality of servers 12 that are coupled to a plurality of client computers 14. The servers 12 may also be coupled to a network attached storage 16 (NAS). The NAS 16 may include one or more mass storage systems 18 coupled to the network by a NAS controller 20. By way of example, each mass storage system 18 may include a plurality of mass storage devices such as hard disk drives (not shown). The NAS controller 20 controls the flow of information between the servers 12 and the mass storage systems 18.

The network 10 may include routers, hubs, etc. (not shown) that allow information to be transferred between the client computers 14, servers 12 and NAS 16. The network may be, or include, a local area network (LAN), a metropolitan area network (MAN), or a wide area network (WAN). By way of example, the network 10 may be the Internet.

Figure 2:
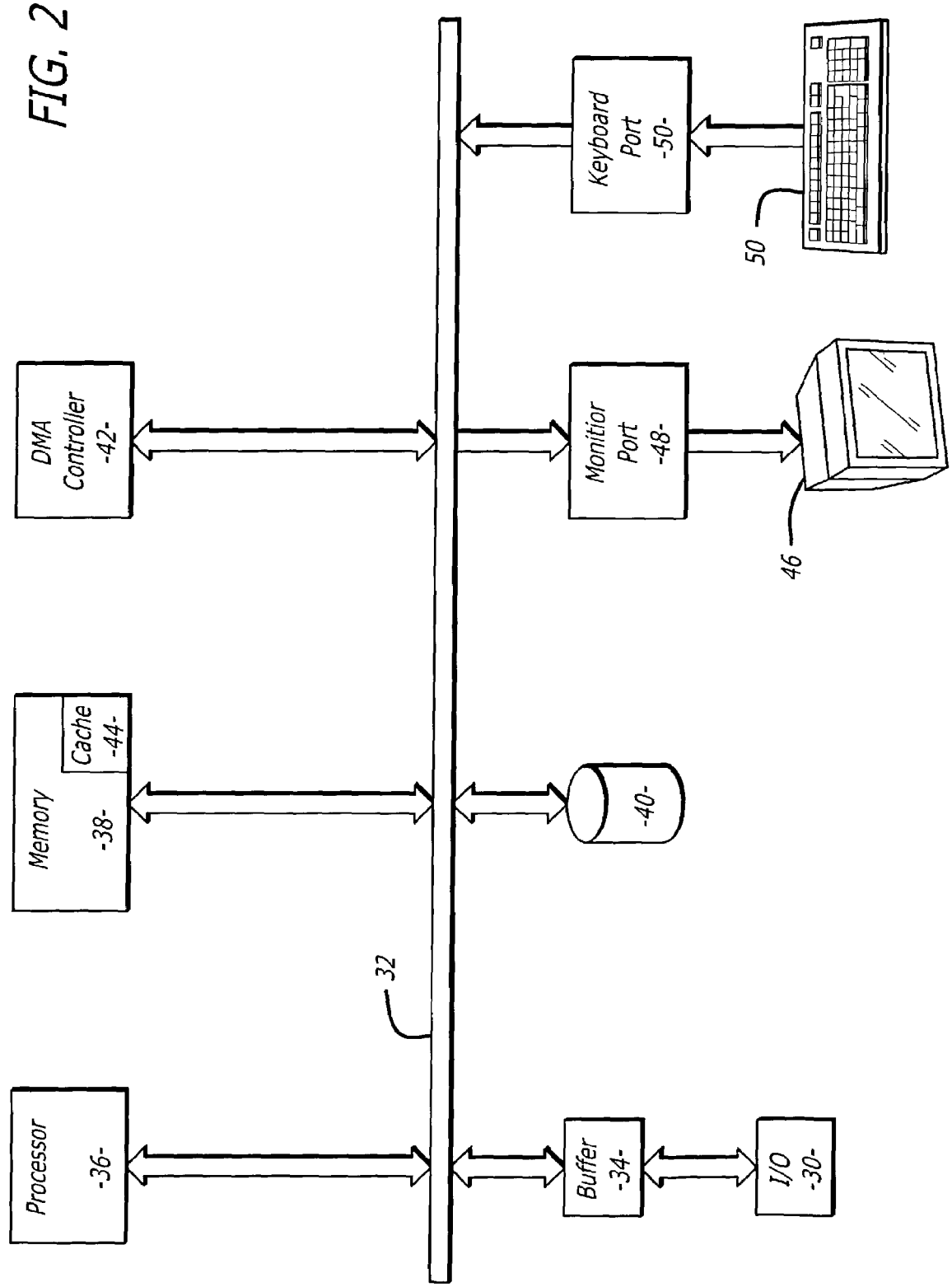
FIG. 2 is a hardware schematic of a server in the network.

FIG. 2 shows an embodiment of a server 12. The server 12 includes a network input/output (I/O) interface 30 that is coupled to a bus 32. The network I/O interface 30 is coupled to the network 10. By way of example, the I/O interface 30 may include electrical circuits and software that operate Ethernet communication protocol. The I/O interface 30 may include buffer memory 34 that temporarily stores information transceived with the network.

The server 12 includes a processor 36, random access memory (RAM) 38 and a mass storage device 40 that are all coupled to the bus 32. Access to memory 38 may be controlled by a direct memory access (DMA) controller 42. The server 12 may also include cache memory 44. The cache may be a portion of memory 38 allocated to caching. The cache 44 may include control logic, maps, etc. (not shown) required to access the contents of this block(s) of memory. The server 12 may also have a monitor 46 with an accompanying interface port 48 and a keyboard/mouse 50 with a corresponding interface port 52.

Figure 3:
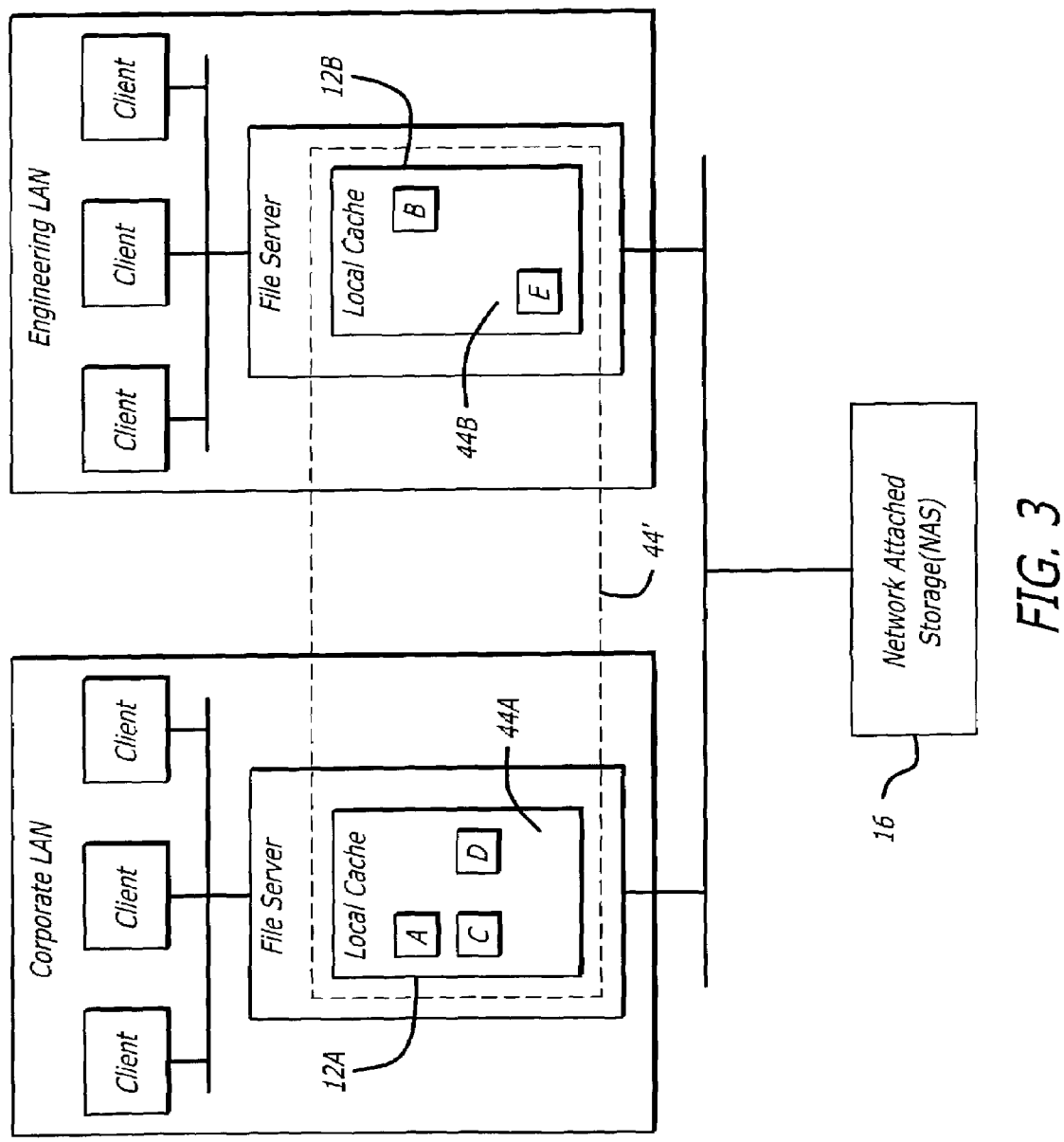
FIG. 3 is a schematic showing a pair of servers having a distributed cache.

As shown in FIG. 3, the network servers 12A and 12B operate to combine the caches 44 of each server 12 into a collective distributed cache 44'. The distributed cache 44' allows any of the client computers 14 to quickly access information within the cache 44' without having to retrieve such information from the NAS 16.

Figure 4:
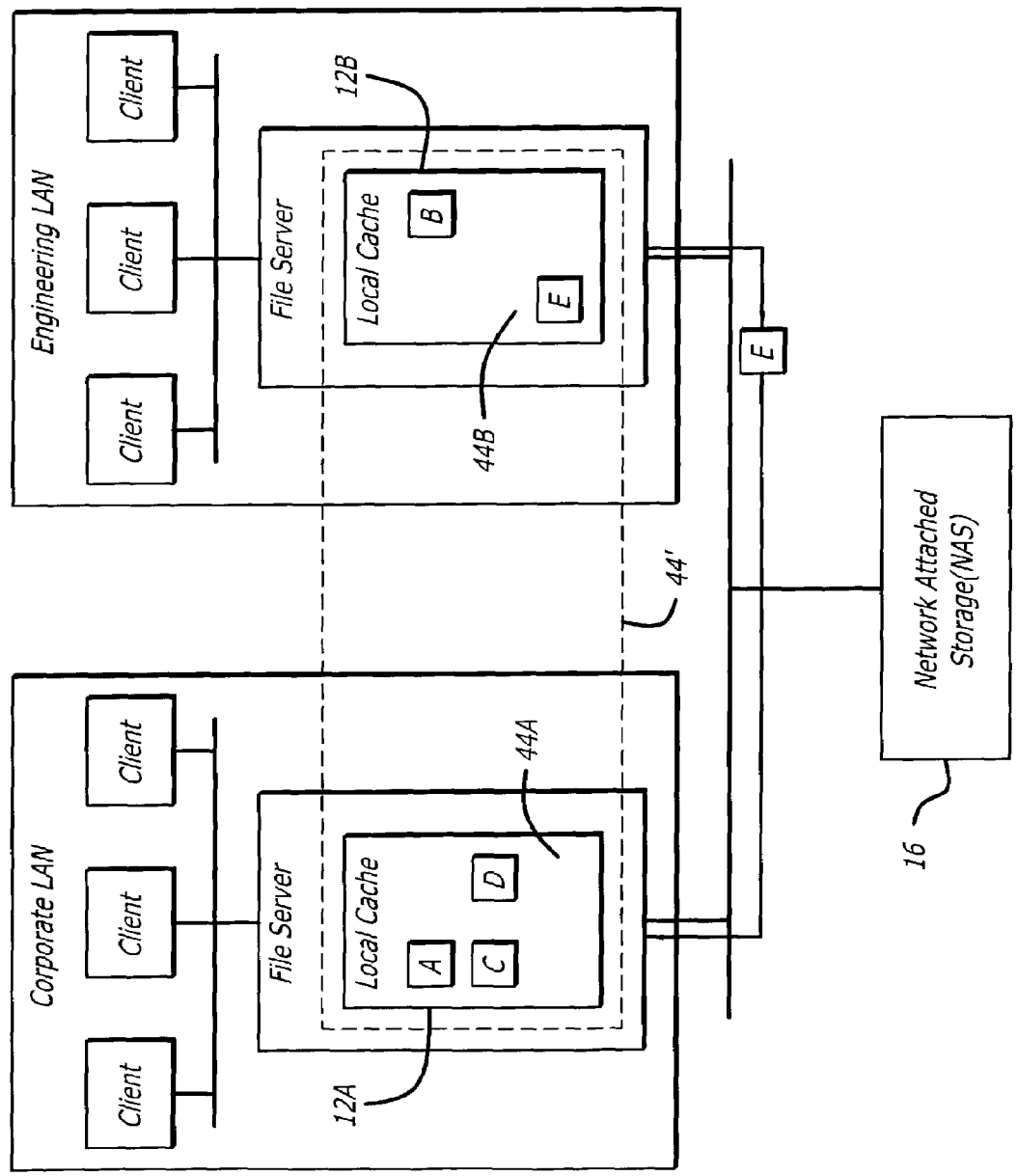
FIG. 4 is a schematic showing a file block being transferred from a cache of one server to another server.

By way of example, server 12A may retrieve file blocks A, C and D from the NAS 16. Server 12B may retrieve file blocks B and E. File blocks A, C and D are stored within the cache 44A of server 12A. File blocks B and E are stored within the cache 44B of server 12B. A client may request file block E. As shown in FIG. 4, instead of having to retrieve file block E from the NAS 16, the server 12A can retrieve the file from server 12B. The server 12A then provides the data block to the requesting client. The server 12B can provide file block E in less time than the NAS 16, which must access mass storage devices such as hard disk drives.

Figure 5:
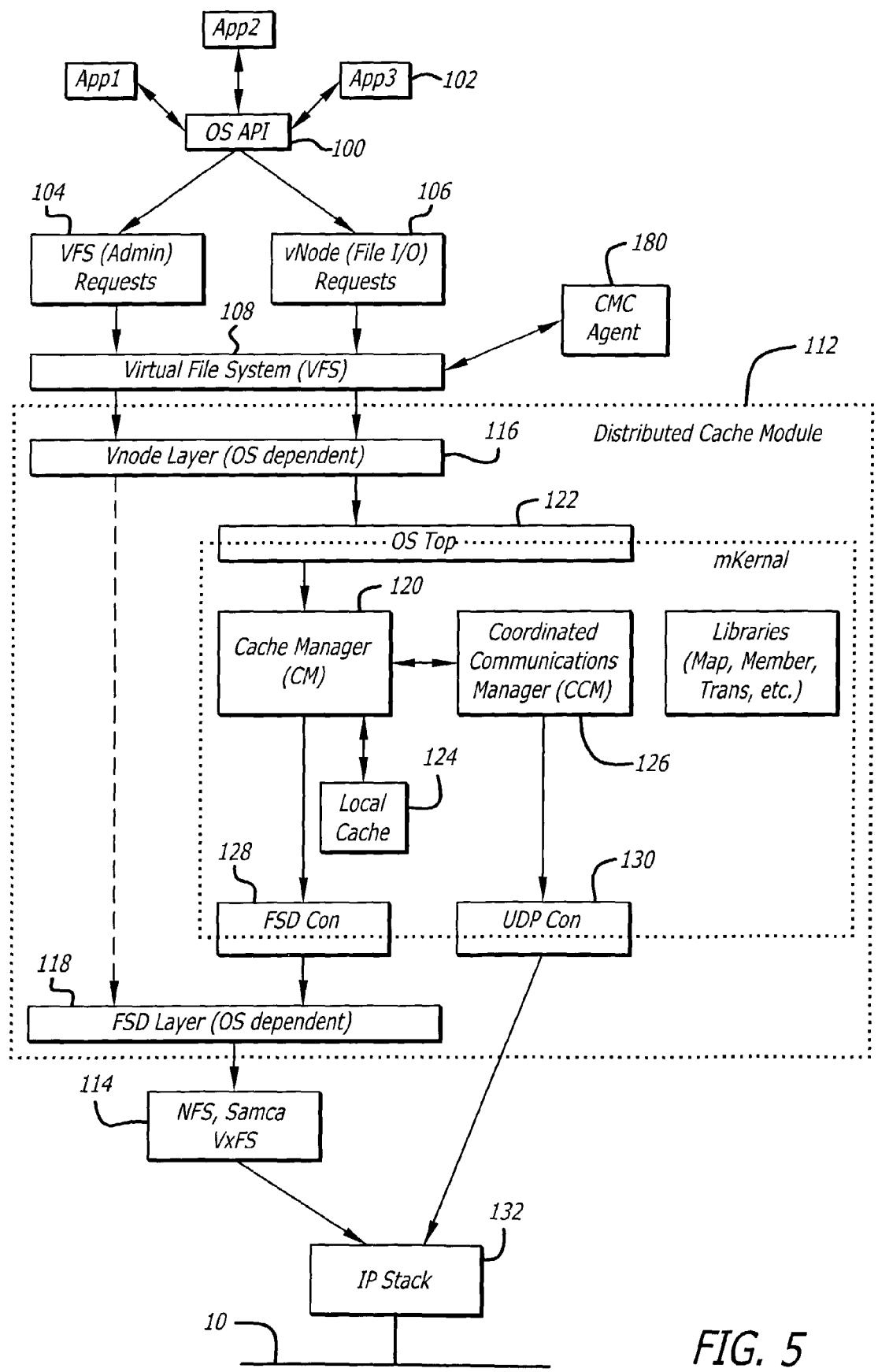
FIG. 5 is a software schematic of a server in the network.

FIG. 5 shows the various software modules operated by each server 12. Each server 12 typically includes an operating system 100 that is linked to a plurality of applications 102. The operating system 100 that typically issues and accepts two types of commands, administration 104 and file I/O 106. Administration request can mount, unmount file systems, collect statistics, etc. File I/O requests include access to specific file data. The requests may be retrieved from memory by a virtual file system (VFS) 108.

The server 12 may operate a distributed cache module 112 that is linked to a network file system (NSF) module 114. The NSF 114 provides an interface to the network 10. The distributed cache module 112 processes requests from the virtual file system 108 to determine if the requests can be satisfied by the server cache, or the cache of another server within a distributed cache.

The distributed cache module 112 may include a virtual/node (Vnode) layer 116 that provides an interface with the virtual file system 108. By way of example, the Vnode layer 116 can be constructed to interface with either an operating system sold by Sun Microsystems, Inc. under the trademark SOLARIS, or Microsoft, Inc. under the trademarks WINDOWS NT and WINDOWS 2000. By way of example, Table I provides a list of requests that can be made through the Vnode layer 116 adapted to run with the SOLARIS platform.

TABLE I

| Request | Description |
| --- | --- |
| Vop_access( ) | Checks access to a given Vnode |
| Vop_addmap( ) | Increments the map count |
| Vop_close( ) | Close a file |
| Vop_cmp( ) | Compare two Vnodes |
| Vop_create( ) | Create a file |
| Vop_delmap( ) | Decrement the map count |
| Vop_dispose( ) | Frees a page from a Vnode |
| Vop_dump( ) | Dump kernel debug data |
| Vop_dumpctl( ) | Prepare for a kernel dump |
| Vop_frlock( ) | Handle file and record locks |
| Vop_fsync( ) | Write dirty pages for a Vnode |
| Vop_getattr( ) | Get the attributes for a Vnode |
| Vop_getpage( ) | Read file data into a page |
| Vop_getsecattr( ) | Get access control attributes |
| Vop_inactive( ) | Free resources for a Vnode |
| Vop_ioctl( ) | Handle I/O control requests for a Vnode |
| Vop_fid( ) | Get unique file ID for a Vnode |
| Vop_link( ) | Create a link to the Vnode |
| Vop_lookup( ) | Translate a given path/filename to a Vnode |
| Vop_map( ) | Map file ranges into memory pages |

TABLE I-continued

| Request | Description |
| --- | --- |
| Vop_mkdir( ) | Create a directory |
| Vop_open( ) | Open a file |
| Vop_pageio( ) | Handle swap file access requests |
| Vop_pathconf( ) | Establishes file system parameters |
| Vop_poll( ) | Handle requests for the poll( ) system function |
| Vop_putpage( ) | Write a file page |
| Vop_read( ) | Map a file range to memory pages |
| Vop_readdir( ) | Read a directory |
| Vop_readlink( ) | Follow a link |
| Vop_realvp( ) | Gets a real Vnode from a supplied Vnode |
| Vop_remove( ) | Delete a file |
| Vop_rename( ) | Rename a file |
| Vop_rmdir( ) | Remove a directory |
| Vop_rwlock( ) | Sets write lock for a write operation |
| Vop_rwunlock( ) | Clears a write lock |
| Vop_seek( ) | Seek within a file |
| Vop_setattr( ) | Sets attributes for a Vnode |
| Vop_setfl( ) | Sets file locks on the Vnode |
| Vop_setsevattr( ) | Set access control list attributes |
| Vop_shrlock( ) | Shared lock support |
| Vop_space( ) | Frees space for a Vnode |
| Vop_symlink( ) | Create a symbolic link between two path/files |

The Vnode layer 116 may pass a request from the virtual file system 108 directly to a file system driver (FSD) layer 118, or to a cache manager (CM) layer 120 through an operating system (OS) top layer 122. The CM layer 120 may be linked to a cache layer 124 used to retrieve and store data within the server cache 44. The CM layer 120 is also linked to a coordinated communications manager (CCM) layer 126 that can control the transfer of information with the other servers 12 in the distributed cache. The CM layer 120 may be linked to the FSD layer 118 by a FSD connect layer 128. The distributed cache module 112 may further include a uniform datagram protocol (UDP) connect layer 130 that is directly linked to a TCP/IP layer 132.

NT/2000 based systems typically generate two types of request mechanisms. The first is a fast I/O request, the second is an I/O request packet (IRP). Fast I/O requests are synchronous call—return mechanisms intended to access cached file blocks. IRP requests are asynchronous, send request and go to sleep, request mechanisms. Fast I/O requests are optional for NT/2000 based systems. IRP requests are formatted by the Vnode layer 116 into module cache request packets (MCRPs) that are sent to the CM layer 120. Information located in cache, either directly in the server cache, or within the distributed cache, is transferred to a kernel buffer and a TRUE indication is provided back through the Vnode layer to the virtual file system 108. If the information is not within cache, the Vnode layer reformats the IRP requests into module file request packets (MFRPs) that are linked to the FSD layer 118.

Fast I/O requests are formatted by the Vnode layer 116 into module cache request packets (MCRPs) that are sent to the CM layer 120. Information located in cache, either directly in the server cache, or within the distributed cache, is transferred to a user buffer and a TRUE indication is provided back to the virtual file manager 108. If the information is not within cache the virtual file manager receives a FALSE indication and then generates an IRP request.

Tables II and III summarize the structure of various I/O requests from the Vnode layer 116 formatted as MCRP and MFRP, respectively.

TABLE II

| Field | Description |
| --- | --- |
| Type | Always set to MCRP |
| Size | Byte size of structure |
| I/O Request Type | Defines type of request — |
| Process ID | The process initiating the request |
| Request ID | Unique ID for this request (response must have same ID). |
| Request sub ID | Unique sub ID for request (response must have same sub ID). |
| (Out) Response Code | To be filled in by the Cache Manager (0 indicates a no-error response). |
| (Out) New lock ID | Returned lock ID |
| (Out) Cache data* | Pointer to the cached data block |
| (Out) Cache data len | The number of bytes in the cache data block, or the number of bytes transferred |
| I/O Volume ID | Volume identifier |
| I/O Filename | Fully qualified path name for file |
| I/O File Type | Indicates whether a normal file or a directory. |
| I/O Location | Byte start location in file |
| I/O Length | Byte length of block |
| I/O Lock ID | The ID for the request. |
| I/O Wait | TRUE if the caller can wait for the data. If FALSE, and the data is not in the distributed cache, an error must be returned. If TRUE, the Cache Manager may request data blocks from the FSD interface. |
| I/O Buffer* | Data buffer address |

TABLE III

| Field | Description |
| --- | --- |
| Type | Always set to MFRP |
| Size | Byte size of structure |
| Request ID | Unique ID for this request (response must have same ID). |
| Requestor ID | Set to either VNODE or CACHE |
| (Out) Response Code | To be filled in by the FSD Interface layer (0 indicates a no-error response). |
| FS valid | TRUE if the system specific info is valid in the FS Union (i.e. Windows IRP) |
| FS Union | Pointer to the Windows IRP block. Note*** for non-Windows implantations, this will point to the system specific structure which is applicable. |
| I/O valid | TRUE if the I/O fields are valid (only used if a system specific structure wasn't attached). |
| I/O Request Type | See MCRP I/O Request types (above). |
| I/O Volume ID | Volume identifier |
| I/O Filename | Fully qualified path name for file |
| I/O File Type | Indicates whether a normal file or a directory. |
| I/O Location | Byte start location in file |
| I/O Length | Byte length of block |
| I/O Lock ID | The ID for the request. |
| I/O Process ID | The process ID making the request |
| I/O Buffer* | Data buffer address |

Figure 6:
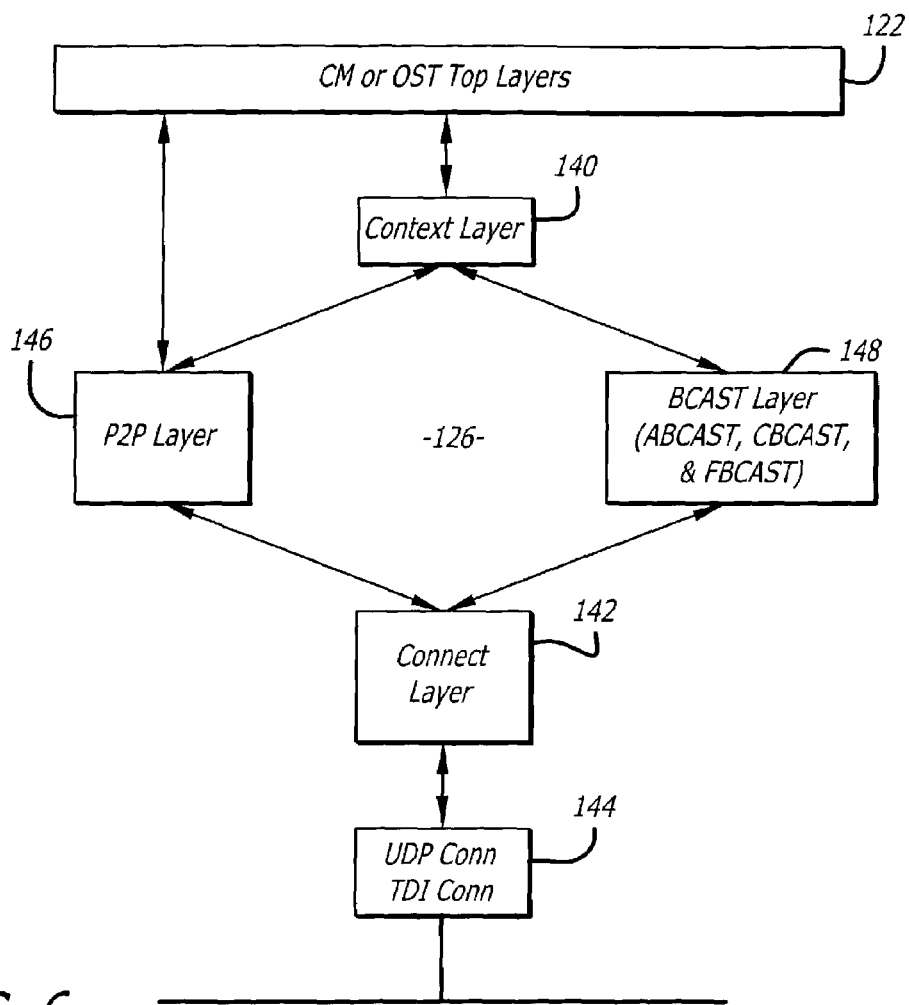
FIG. 6 is a software schematic of a coordinated communications manager of the server.

FIG. 6 shows an embodiment of a CCM layer 126. The CCM layer 126 includes a context layer 140 that is coupled to a connect layer 142 and a UDP/TLI/TDI layer 144 by a point to point (P2P) layer 146, or a broadcast (Bcast) layer 148. The UDP/TLI/TDI layer 144 provides an interface to the network communications stack. The context layer 140 maintains groups of servers within a "context". Servers are typically grouped into a coalition that can share distributed cache. Each server can join and leave a context within the coalition. By way of example, a context may be access to a particular data file. Each server in a context has requested or will request access to the file.

The P2P layer 146 allows dedicated communication between two servers. The following Table IV lists the point to point transactions that can be performed by the CM 120 and CCM 126 layers.

TABLE IV

| | |
| --- | --- |
| Prediction Request | The source is attempting to discover information relating to a file from the destination |
| Data Request | The source is attempting to retrieve a copy of the file's data from the destination. |
| Data Demand | The source is attempting to retrieve the original of the file's data from the destination. |
| Forward Request | The source is attempting to send the original of the file's data to the destination. |

The Bcast layer 148 allows for a more distributed communication between the servers. The Bcast transactions are issued when the Vnode layer 116 issues a MRCP packet with a file open complete, file open create or file close Opcode. The Bcast layer 148 may generate two types of messages; a causal broadcast (CBCAST), or an absolute broadcast (ABCAST).

CBCAST adds a logical timestamp to each message transmitted in a given process to insure that the messages are delivered in a correct order. The logical timestamp is a means of insuring orderly processing of messages without a central manager. The logical timestamp is a vector timestamp not a true stamp of time. The vector time stamp includes an "n" vector array, where n is the number of servers in a context. When a context is first created the time stamp is cleared to all zeroes. The first server that sends a message in the process increments its variable stamp. The incremented timestamp is sent with the message. Upon receipt of the message the server will retrieve the timestamp and determine whether each preceding timestamp has been received. If not, the message is maintained in buffer and delayed.

Figure 7:
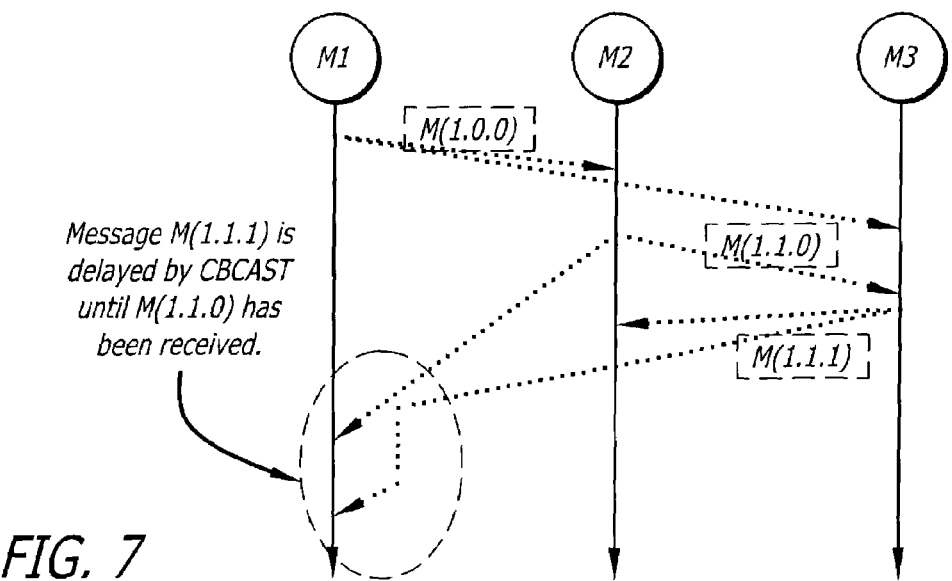
FIG. 7 is an illustration of messages being transmitted between servers of the network.

FIG. 7 provides an example of the use of the logical timestamp. There are three servers in the group, the vector array is therefore (x, y, z). The first server M1 sends a message with the timestamp (1.0.0). The second server M2 receives the message and sends a second message with timestamp (1.1.0). The third server M3 receives the first and second messages and sends a message with the timestamp (1.1.1). The first server M1 does not receive the message from the second server M2 until after receiving the message from the third server M3. The first server M1 will delay the third message M(1.1.1) until receiving the second message M(1.1.0) because the server M1 did not receive all preceding timestamps. The logical timestamp insures an orderly processing of messages without the need for a network manager.

The ABCAST protocol insures that all destination servers receive messages in the same order when joining or leaving a context. The ABCAST resides on top of the CBCAST protocol. The ABCAST protocol includes a cookie that is passed between servers. By way of example, the cookie may be assigned to the server with the lowest ID in a context. That server may maintain the cookie until it leaves the context.

A server with a cookie can issue an ABCAST message by adding a context member ID to the message. A server without the cookie must request the cookie or wait for the present owner to pass the cookie. Only the current owner of the cookie can broadcast an ABCAST message.

The context modules of the servers allow a server to join a context, without the need for a network manager. The joining server sends an ABCAST message to join a context.

By way of example, the joining server may send a join message after receiving a file request from a client computer for a file.

Before joining a coalition the server attempts to either allocate or obtain a member ID. The server sends a ConnectAcquireID message that contains an allocated member ID. The message includes a common header which is the ID of the root context or coalition. The message may also include a member ID field and a character string.

The server also initiates a timer. The timer insures that the server does not wait indefinitely for a response. If there is no response the server retains the self selected member ID. Alternatively, the member ID selected by the server may be used by another server but in another context. The other server will return a NACK message but without a suggested ID for the transmitting server. The transmitting server will then try a new member ID. If the other server is in the same context it will respond with a NACK message and a suggested member ID.

As yet another alternative, the server with the lowest member ID in the context sends an ACK return message with a view. The view contains the member IDs for all other members in the context. Since each server in a context knows all the other servers in the context, only one server need respond. The joining server will then transmit a join ABCAST message to join the context. The server takes a member ID that is one number higher than the highest member ID in use. Table V shows the various messages for context messages.

TABLE V

| Message type | Description |
| --- | --- |
| JoinRequest | This is used to indicate a request to join a context. |
| JoinRequestAck | This is sent in response to the join request. If sent, it also contains a list of member nodes already members of the context. |
| JoinRequestNack | If a node has a reason to prevent the requesting node from joining. |
| Join | This is sent as a notification by a node that it has joined the context. |
| Leave | This is used to indicate that a node is leaving the context. |
| User data | This is used to denote that the message contents are for an upper layer application. |
| ContextIAcquireID | Used to acquire a context ID. |
| ContextACcquireID NACK | Used to indicate the requested ID is already in use, and if possible, to give the actual ID to use. |
| Update request | Sent to a node to request an update to its list of known contexts (i.e. contexts for which it is a member). This is sent when a node has been detected as having "bounced". |
| Update ACK | Response sent with list of contexts. |

The CBCAST and ABCAST broadcast may be transmitted and received in accordance with a first in first out broadcast (FBCAST) protocol. FBCAST creates an order for transmitting messages between servers. The FBCAST protocol includes the following messages:

| Message Type | Description |
| --- | --- |
| DATA | (Broadcast) Sends the actual user data message to all members |
| REQUEST NACK | (Broadcast) Sent to all members to request a NACK if the message has not been received. |

-continued

| Message Type | Description |
| --- | --- |
| NACK | (Direct) Sent by a member if a message number has not been received. |

The FBCAST protocol includes a header with the following fields:

| Header Value | Description |
| --- | --- |
| Source Member | Member ID sending the message |
| Message number | The message number for this message |
| Service type | The service type (ABCAST, CBCAST, etc) for this message. |
| Flags | Various flags attached to this message |

The flag field includes the following flags:
FBCAST
FLAG_NORMAL—A normal message
FLAG_CONTROL
FLAG_NEWSEQUENCE—Start of a new FBCAST sequence
FLAG_RETRANS—This message is a retransmission of another message FBCAST is performed by a sublayer within the BCAST LAYER 148. FBCAST holds a transmitted message within a queue until a timer expires. When the timer expires FBCAST will remove the message if another message has been sent or a REQUEST NACK has been previously transmitted. If another message has not been received then FBCAST sends a REQUEST NACK.

When a message is received the FBCAST removes the header and determines whether the message is in order or the start of a new sequence. If the message is in order, FBCAST forwards the message to the proper protocol engine. If the received message is not in order the message is stored in a queue and a timer is set. If a subsequent message is received that creates a proper sequence, the messages are forwarded. If the timer expires, FBCAST sends a NACK message to the transmitting server and resets the timer. FBCAST continues this process until it receives a message(s) that creates a proper sequence or the transmitting server discontinues transmission.

Referring back to FIG. 6, the connect layer 142 creates connections to each server in a context and detects when servers do not respond. The connect layer 142 can locate servers within a context with various addressing schemes and tables. The assignment of member IDs can be performed by the connect layer 142. The connect layer 142 may prepend a header to each message. Table VI is an example of fields that may be in the header.

TABLE VI

| Header Field | Description |
| --- | --- |
| Version | Protocol version (always 0x0001). |
| Message Type | The type of message being sent. |
| Message Flags | Individual flags to control the protocol |
| Coalition ID | Identifies coalition to which member belongs. |
| Destination Member ID | The Connect ID the message is destined for |
| Source Member ID | The Connect ID the message was sent from |
| Message ID | The ID number for this message (0 means "no ID" and is used for ACK and NACK messages only) |

TABLE VI-continued

| Header Field | Description |
| --- | --- |
| Protocol | This defines the protocol layer the message is from and to. |
| Member TB Value | The "tie breaker" value for the sending computer |
| Ack | Along with Message type is used to refine actual message. |
| Coalition name | Textual name for the coalition. Not in all messages. |
| TimeStamp | Time when message was sent. This only appears in Query messages. |

The connect layer 142 may also send various messages. Table VII is an example of the message that can be sent by the connect layer.

TABLE VII

| Message Type | Description |
| --- | --- |
| Normal Data | A normal DATA message, sent by upper layer protocols/apps |
| Discovery | Sent at startup to test a member ID. Machines will respond with Discovery ACK or NACK messages. |
| Discovery ACK | An acknowledgement that the ID test was successful. This is ONLY sent at initial startup, to allow the starting Connect entity to build its member list. This message also contains a complete list of known members. |
| Discovery NACK | An ack of the Discovery message which indicates the ID was in use. This message also contains a complete list of known members. |
| Test ID | Test if an ID number is in use. |
| ID NACK | The tested ID number was in use. |
| Query | A message sent to query the condition of the site/station. |
| Query ACK | An acknowledgement for the Query message. |
| ID Claim | Used to claim a specific ID |
| ID Claim NACK | If ID already in use after claim process initiated. |
| Shutdown | A node sends this when it is shutting down. |

Figure 8:
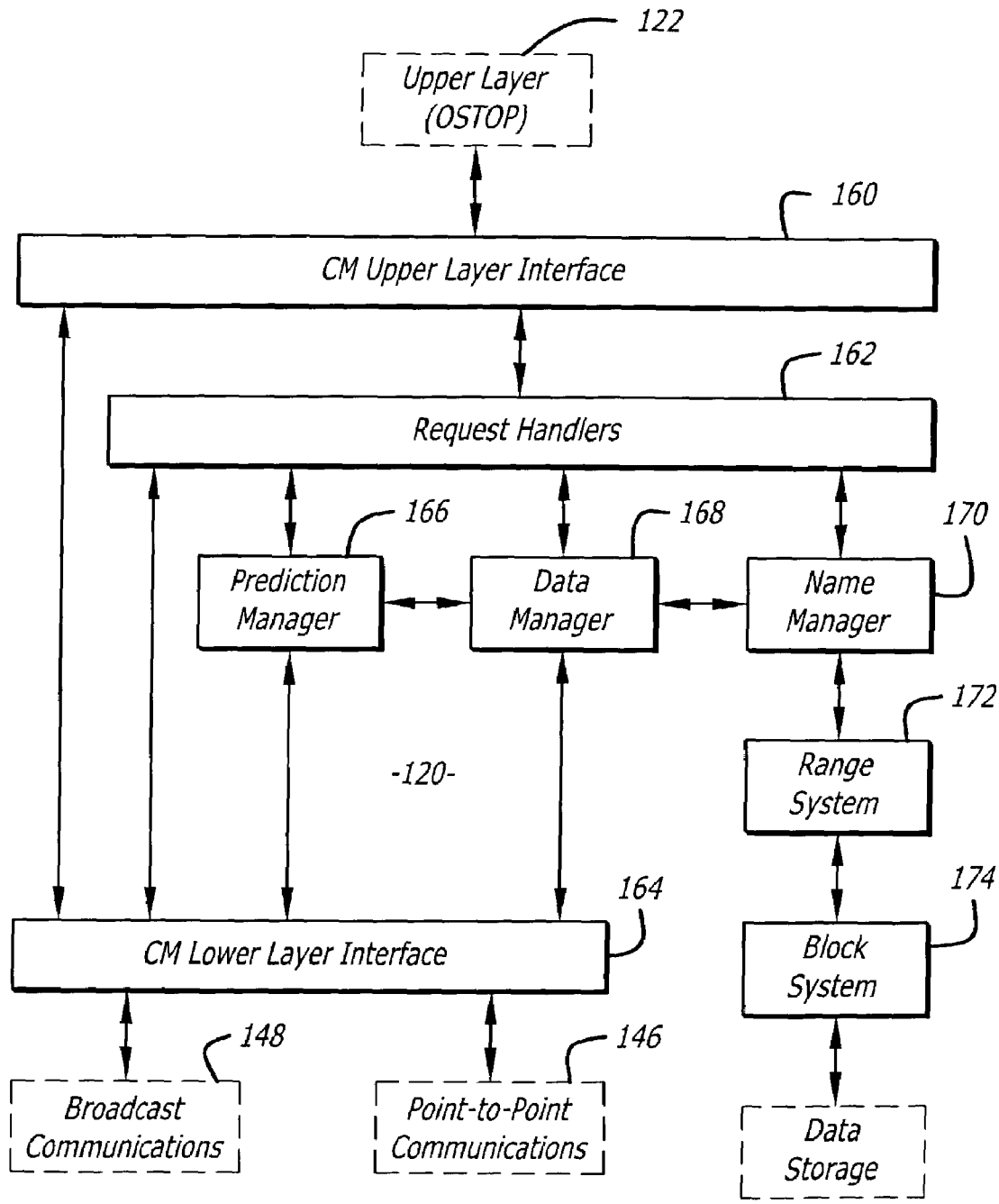
FIG. 8 is a software schematic of a cache manager of the server.

FIG. 8 shows an embodiment of a CM layer 120. The CM layer 120 may include an upper layer interface layer 160 and a request handler layer 162 that provide an interface with the OS interface layer 122 of the distributed cache module 112. The CM layer 120 may further have a lower interface layer 164 that provides an interface to the P2P 146 and Bcast 148 layers of the CCM layer 126.

The CM layer may include a prediction manager 166. The prediction manager 166 contains predictions on the possible location of information requested from the virtual file system 108. The predictions may include the location of a file's range of blocks within the distributed cache. In the example shown in FIGS. 3 and 4, server 12A would contain a prediction that file block E is located at server 12B. Server 12A would then generate a point to point transaction to retrieve file block E from server 12B.

The CM layer 120 may include a data manager 168 that moves data between the caches of the distributed cache. To provide a more efficient means of locating and retrieving cached information the CM layer 120 may include a name manager 170, a range system 172 and a block system 174.

Each file is represented by a name structure entry. The entry may be indexed by a key that is produced by compressing the filename. By way of example, compression may be utilized with a CRC32 technique. The keys are stored in a hash key table that is managed by the name manager 170. Each name entry has pointers to a number of range entries that are managed by the range system 172. Each range entry includes pointers to a list of data blocks that are managed by the block system 174. The blocks contain the actual data stored in the cache 44.

Figure 9:
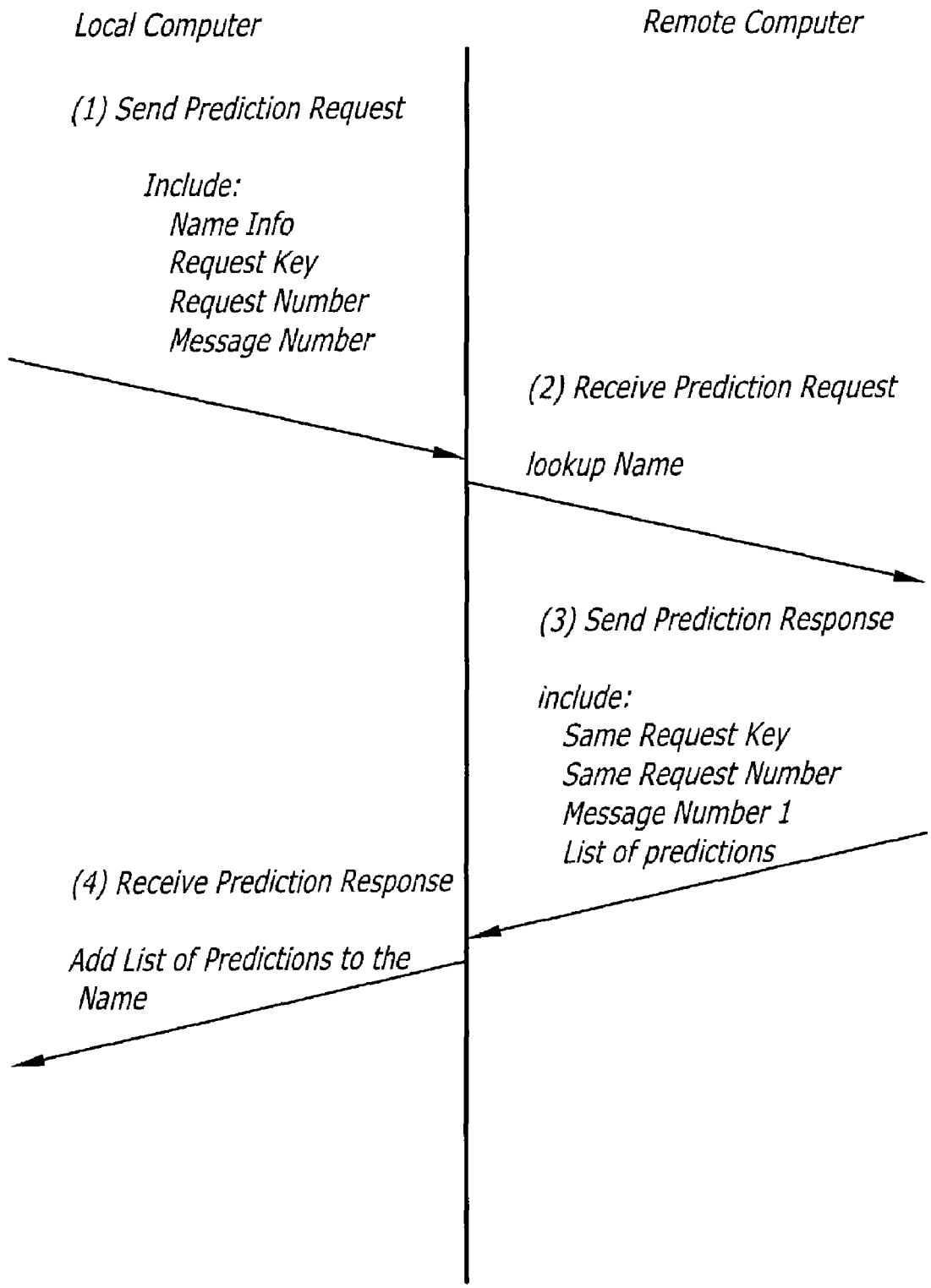
FIG. 9 is a diagram showing a prediction transaction between servers of the network.

FIG. 9 shows a transaction diagram of a prediction request from one server to another server. The prediction request can be sent if one server has information that the other server was the last to contain the desired file. Alternatively, the server may sequentially query one or more servers for predictions.

Figure 10:
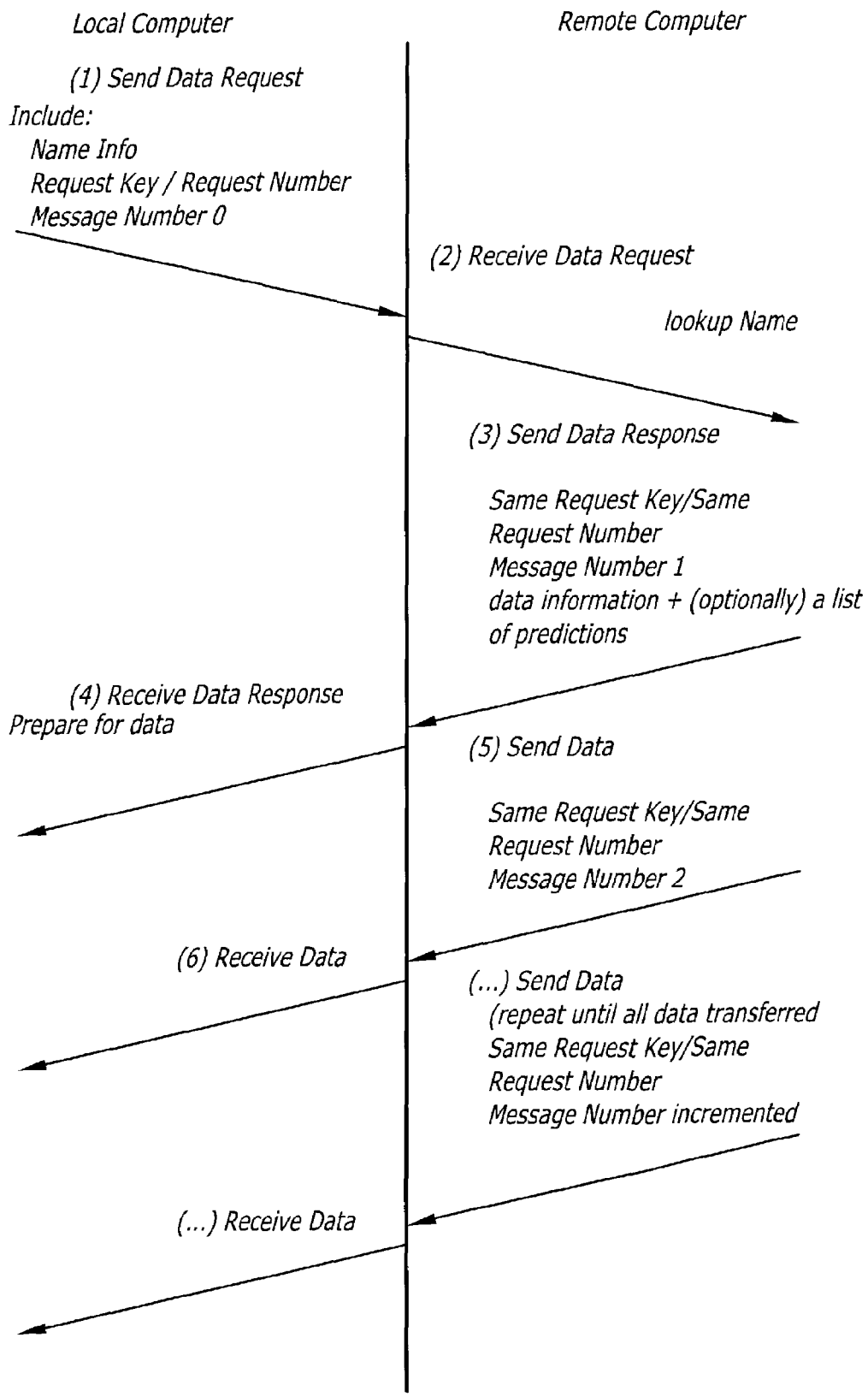
FIG. 10 is a diagram showing a data transaction between servers of the network.
Figure 11:
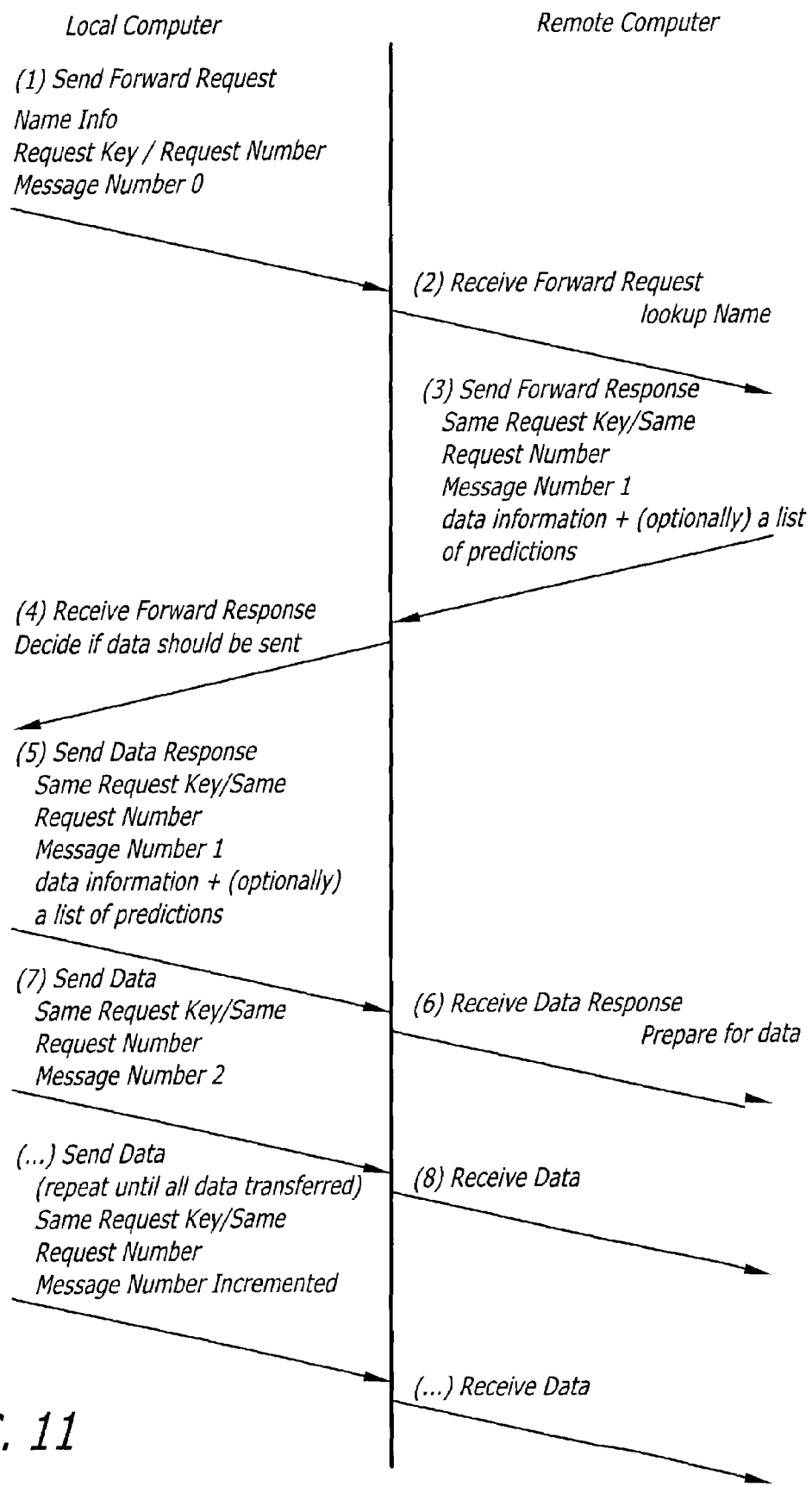
FIG. 11 is a diagram showing a forward data transaction between servers of the network.

FIG. 10 shows the transfer of data between servers. FIG. 11 shows the forwarding of data between servers. No ACK messages are used to send the data in either transaction. Forwarding data is typically performed when the cache of one server is full. Forwarding the data empties some of the server's cache to allow further use of the local cache.

Referring to FIGS. 1 and 5, each server may include a coalition management console (CMC) agent 180 that can receive messages and commands from a CMC station 182 connected to the network 10. The CMC station 182 may transmit configuration parameters to the CMC agents 180. The configuration parameters may define which servers 12 are located in various coalitions. The CMC agent 180 may provide a hostname for mapping functions by the connect layer 142 of the CCM layer 126.

In operation, the user may request a file through an application. The request filters to the Vnode layer 116 which formats the request into a MRCP packet that is forwarded to the CM manager 120. Using the name manager 170 and the range system 172 the CM layer 120 determines if the requested data is in cache. If the requested data is not in cache then the prediction manager layer 166 determines whether there is a prediction that the requested data is located in the cache of another server. If the data is located in another cache of the distributed cache then the servers enter the transaction shown in FIG. 10 to obtain the data from the remote server.

If the prediction manager does not contain a prediction regarding the request, the CM layer 120 may conduct the transaction shown in FIG. 9 to obtain a prediction from another server. If the request cannot be satisfied by any cache within the coalition of servers then the distributed cache module provides a FALSE indication to the virtual file system 108. The virtual file manager then generates a IRP request which is reformatted by the Vnode layer 116 into a MFRP packet. The MFRP packet is processed by the NFS 114 and TCP/IP 132 (if applicable) layers to retrieve the requested file, or portions thereof, from the NAS 16.

The network may contain a rogue computer that does not contain a distributed cache module. Consequently, the rogue computer may have dirty data within its cache that is different than the data within the NAS. To prevent the reading of invalid data, the distributed cache module 112 may verify a file within the NAS before reading it. If the date and time of a file within the NAS 16 matches the date and time of the cached data, the distributed cache knows that the cache data is valid. If the dates and/or times don't match, the cached data is flushed from the distributed cache.

The CM layer includes a write-through cache process. A server that writes new data into its cache sends a notification of the new data to the other servers in a context. For example, referring to FIG. 3, if the user of server 12A changes file block A, server 12A sends a notification to server 12B that block A contains new data.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A distributed cache system that includes a first server that has a first cache and a second server that has a second cache, comprising:
   a first distributed cache module that resides in the first server and transfers a message and a logical timestamp; and,
   a second distributed cache module that resides in the second server and receives the message, said second distributed cache module delays a transfer of the message if said second server has not received all preceding logical timestamps; and
   wherein said first distributed cache module contains a prediction of a location of data in said second cache of said second server.

2. A network, comprising:
   a first server that includes a first cache and a first distributed cache module, said first distributed cache module transfers a message and a logical timestamp; and,
   a second server that includes a second cache and a second distributed cache module, said second distributed cache module receives the message and delays the transfer of the message if said second server has not received all preceding logical timestamps; and
   wherein said first distributed cache module contains a prediction of a location of data in said second cache of said second server.

3. The network of claim 2, further comprising a rogue server and a network attached storage, said first and second distributed cache modules verify a file before transferring a file from said network attached storage.

4. A method for transferring a message between a first server that has a first cache and a second server that has a second cache, comprising:
   transmitting a message and a logical timestamp from the first server;
   receiving the message at the second server;
   determining whether the second server has received all preceding logical timestamps;
   delaying a transfer of the message if the second server has not received all preceding logical timestamps; and
   transmitting from the first server a message with a self assigned member ID to enter a context.

5. The method of claim 4, further comprising transmitting from the second server to the first server a NACK message with a suggested member ID.

6. The method of claim 4, further comprising transmitting from the second server an ACK message and member IDs for every server in a context.

7. A distributed cache module for a system that includes a first server that has a first cache and a second server that has a second cache, the second cache containing a file block, comprising:
   a first distributed cache module that resides in the first server, said first distributed cache module requests and receives the file block from the second cache of the second server;
   a second distributed cache module that resides in the second server, wherein said first distributed cache module has a cookie; and
   wherein said first distributed cache module contains a prediction of a location of the file block in the second cache of the second server.

8. A network, comprising:
   a first server that includes a first cache and a first distributed cache module, said first cache contains a file block;
   a second server that includes a second cache and a second distributed cache module, said second distributed cache module requests and retrieves the file block from said second cache of said second server; and
   wherein said first distributed cache module contains a prediction of a location of the file block in the first cache of the first server.

9. A network, comprising:
   a first server that includes a first cache and a first distributed cache module, said first cache contains a file block; and,
   a second server that includes a second cache and a second distributed cache module, said second distributed cache module requests and retrieves the file block from said second cache of said second server; and
   a rogue server and a network attached storage, said first and second distributed cache modules verify a file before transferring a file from said network attached storage.

10. A method for transferring a message between a first server that has a first cache and a second server that has a second cache, the second cache containing a file block, comprising:
    receiving a request for the file block by the first server;
    transmitting a request for the file block from the first server to the second server;
    transferring the file block from the second server to the first server; and
    transmitting from the first server a message with a self assigned member ID to enter a context.

11. The method of claim 10, further comprising transmitting from the second server to the first server a NACK message with a suggested member ID.

12. The method of claim 10, further comprising transmitting from the second server an ACK message and member IDs for every server in a context.

13. A distributed cache module for a system that includes a first server that has a first cache and a second server that has a second cache, comprising:
    a first distributed cache module that resides in the first server, said first distributed cache module receives a file request and generates a join message to join a context relating to the file request;
    a second distributed cache module that resides in the second server, wherein said first distributed cache module has a cookie; and
    wherein said first distributed cache module contains a prediction of a location of data in the second cache of the second server.

14. A method for establishing a distributed cache between a first server that has a first cache and a second server that has a second cache, comprising:
    receiving a file request by the first server;
    broadcasting a join request message to join a file context relating to the file request; and,
    joining the file context; and
    transmitting from the first server a self assigned member ID with the join message.

15. The method of claim 14, further comprising transmitting from the second server to the first server a NACK message with a suggested member ID.

16. A distributed cache system that includes a first server that has a first cache and a second server that has a second cache, comprising:
a first distributed cache module that resides in the first server and transfers a message and a logical timestamp;
a second distributed cache module that resides in the second server and receives the message, said second distributed cache module delays a transfer of the message if said second server has not received all preceding logical timestamps; and
wherein said first distributed cache module assigns its own unique member ID.

17. A distributed cache system that includes a first server that has a first cache and a second server that has a second cache, comprising:
a first distributed cache module that resides in the first server and transfers a message and a logical timestamp;
a second distributed cache module that resides in the second server and receives the message, said second distributed cache module delays a transfer of the message if said second server has not received all preceding logical timestamps; and
wherein said logical timestamp includes an n array where n is equal to a number of servers in a file context.

18. A network, comprising:
a first server that includes a first cache and a first distributed cache module, said first distributed cache module transfers a message and a logical timestamp;
a second server that includes a second cache and a second distributed cache module, said second distributed cache module receives the message and delays the transfer of the message if said second server has not received all preceding logical timestamps; and
wherein said first distributed cache module assigned its own unique member ID.

19. A network, comprising:
a first server that includes a first cache and a first distributed cache module, said first distributed cache module transfers a message and a logical timestamp;
a second server that includes a second cache and a second distributed cache module, said second distributed cache module receives the message and delays the transfer of the message if said second server has not received all preceding logical timestamps; and
wherein said logical timestamp includes an n array where n is equal to a number of servers in a context.

20. A network, comprising:
a first server that includes a first cache and a first distributed cache module, said first distributed cache module transfers a message and a logical timestamp;
a second server that includes a second cache and a second distributed cache module, said second distributed cache module receives the message and delays the transfer of the message if said second server has not received all preceding logical timestamps; and
a rogue server and a network attached storage, said second distributed cache module verifies a file before transferring said file from said network attached storage.

21. A method for transferring a message between a first server that has a first cache and a second server that has a second cache, comprising:
transmitting a message and a logical timestamp from the first server;
receiving the message at the second server;
determining whether the second server has received all preceding logical timestamps;
delaying a transfer of the message if the second server has not received all preceding logical timestamps;
transmitting from the first server a message with a self assigned member ID to enter a context, wherein the context is a group of servers that have access to a selected file; and
transmitting from the second server to the first server a NACK message with a suggested member ID.

22. The method of claim 21, further comprising transmitting from the second server an ACK message and member IDs for every server in the context.

23. A distributed cache module for a system that includes a first server that has a first cache and a second server that has a second cache, the second cache containing a file block, comprising:
a first distributed cache module that resides in the first server, said first distributed cache module requests and receives the file block from the second cache of the second server;
further comprising a second distributed cache module that resides in the second server, wherein said first distributed cache module has a cookie;
wherein said first and second distributed cache modules each have a unique member ID in a context; and
wherein said first distributed cache module assigns its own unique member ID.

24. A network, comprising:
a first server that includes a first cache and a first distributed cache module, said first cache contains a file block;
a second server that includes a second cache and a second distributed cache module, said second distributed cache module requests and retrieves the file block from said second cache of said second server; and
wherein said first distributed cache module assigns its own unique member ID.

25. A network, comprising:
a first server that includes a first cache and a first distributed cache module, said first cache contains a file block;
a second server that includes a second cache and a second distributed cache module, said second distributed cache module requests and retrieves the file block from said second cache of said second server; and
a rogue server and a network attached storage, said second distributed cache module verifies a file before transferring said file from said network attached storage.

26. A method for transferring a message between a first server that has a first cache and a second server that has a second cache, the second cache containing a file block, comprising:
receiving a request for the file block by the first server;
transmitting a request for the file block from the first server to the second server;
transferring the file block from the second server to the first server;
transmitting from the first server a message with a self assigned member ID to enter a context, wherein the context is a group of servers that have requested or will request access to a selected file; and
transmitting from the second server to the first server a NACK message with a suggested member ID.

27. The method of claim 26, further comprising transmitting from the second server an ACK message and member IDs for every server in the context.

28. A distributed cache module for a system that includes a first server that has a first cache and a second server that has a second cache, comprising:
- a first distributed cache module that resides in the first server, said first distributed cache module receives a file request and generates a join message to join a context relating to the file request;
- wherein said first and second distributed cache modules each have a unique member ID in the context; and
- wherein said first distributed cache module assigns its own unique member ID that is transmitted with the join message.

29. A network, comprising:
- a first server that includes a first cache and a first distributed cache module, said first server receives a file request and generates a join message to join a context relating to the file request;
- a second server that includes a second cache and a second distributed cache module, said second distributed cache module receives the join message and transmits an ACK message to said first server;
- wherein said first and second distributed cache modules each have a unique member ID in the context, wherein the context is a group of servers that have access to a selected file;
- wherein said first distributed cache module assigns its own unique member ID that is transmitted with the join message; and
- wherein said second server transmits a NACK message with a suggested member ID.

30. The network of claim 29, wherein said second server transmits an ACK message and member IDs for each server joined in the context.

31. A method for establishing a distributed cache between a first server that has a first cache and a second server that has a second cache, comprising:
- receiving a file request by the first server;
- broadcasting a join request message to join a file context relating to the file request; and,
- joining the file context, wherein the file context is a group of servers that have requested or will request access to a selected file;
- transmitting from the first server a self assigned member ID with the join message; and
- transmitting from the second server to the first server a NACK message with a suggested member ID.

32. The method of claim 31, further comprising transmitting from the second server to the first server an ACK message with member IDs of other servers in the file context.

* * * * *